United States Patent [19]

Baker et al.

[11] Patent Number: 4,689,507

[45] Date of Patent: Aug. 25, 1987

[54] VENTILATION STRUCTURE FOR AN ELECTRIC MOTOR

[75] Inventors: Gerald N. Baker, Florissant; Carl R. Fischer, St. Louis, both of Mo.

[73] Assignee: Emerson Electric Co., St. Louis, Mo.

[21] Appl. No.: 844,695

[22] Filed: Mar. 27, 1986

[51] Int. Cl.[4] ............................................. H02K 9/06
[52] U.S. Cl. ...................................... 310/62; 310/42; 310/58; 310/63; 310/89; 403/326; 416/93 R
[58] Field of Search ...................... 310/62, 63, 64, 58, 310/59, 157, 42, 91, 89; 403/326, 373; 98/69, 72; 464/47, 52; 416/93 R

[56] References Cited

U.S. PATENT DOCUMENTS

| 2,822,485 | 2/1958 | Braun | 310/157 |
| 4,488,070 | 11/1984 | Iwaki | 310/63 |
| 4,492,885 | 1/1985 | Kitamura | 310/63 |

FOREIGN PATENT DOCUMENTS

| 0217119 | 2/1961 | Austria | 310/62 |
| 2844245 | 4/1980 | Fed. Rep. of Germany | 310/62 |
| 01966 | 6/1982 | Japan | 310/62 |
| 0474080 | 6/1975 | U.S.S.R. | 310/62 |

*Primary Examiner*—R. Skudy
*Attorney, Agent, or Firm*—Polster, Polster and Lucchesi

[57] ABSTRACT

An improved electric motor ventilation structure including a "pull through" fan associated with a motor endshield including a shaft for supporting a fan on one end thereof, and defining a preselectively spaced and contoured air inlet and air circulating chamber adjacent the stator and rotor assembly of the electric motor to cause the circulating air to break the "hot" boundary layer of air immediately adjacent the motor windings.

5 Claims, 6 Drawing Figures

VENTILATION STRUCTURE FOR AN ELECTRIC MOTOR

BACKGROUND OF THE INVENTION

This invention relates to electric motor structure and more particularly to an improved electric motor ventilation structure wherein a rotor shaft mounted "pull through" fan is associated with a motor endshield defined air circulating chamber adjacent the stator and rotor assembly of an electric motor to cause circulating air to break the "hot" boundary layer of air immediately adjacent the motor windings.

It is known in the art of electric motor structure to generally circulate air over the rotor and stator assembly of an electric motor to regulate motor winding temperature. Various motor housing designs have been provided to allow air to enter into the motor housing with or without the use of air movers to provide cooling air into the housing so as to pass over and ventilate the stator and rotor windings. For the most part, these past motor housing designs have proven to be costly in manufacture and assembly often failing to provide adequate heat flow from the motor windings to the introduced air and appropriate removal of the heated air from the housing. For example, internal fan blades mounted to end rings on the rotor have been utilized to create a positive pressure flow within the motor housing but the manufacture and assembly has been comparatively costly and the positive air circulating pressure within the motor housing has not avoided the aforementioned heat flow shortcomings.

In accordance with the present invention, a novel ventilating structure for electric motors is provided which recognizes the importance of obtaining proper mass heat flow transfer from the stator and rotor assembly by removing or at least breaking the "hot" boundary layer of air which exists in close proximity to the windings, the inventive structure providing a "pull through" ventilating structure which ensures increased air flow and increased air velocity over and proximate the windings. Further, the structure of the present invention provides a negative pressure within a surrounding chamber proximate the stator and rotor assembly to produce effective continuous flow through of the circulating air and mass heat transfer during motor operations. Moreover, the structural arrangement of the present invention utilizes a novel endshield arrangement in accomplishing this desired ventilation and at the same time rotatably journalling the rotor shaft relative the stator. In addition, the novel, straightforward, and comparatively inexpensive to manufacture and assemble structure of the present invention provides a unique external fan arrangement which can be effectively and efficiently assembled and held in proper operating position on the rotor shaft extending from the stator and rotor assembly of the electric motor.

Various other features of the present invention will become obvious to one skilled in the art upon reading the disclosure set forth herein.

SUMMARY OF THE INVENTION

More particularly, the present invention provides an improved electric motor ventilation structure comprising: a stator and rotor assembly, the rotor being rotatably disposed with reference to the stator and having a rotor shaft extending therefrom; end-shield means secured to the stator for rotatably journalling the rotor shaft relative the stator, the endshield means including an end wall and a peripheral side wall extending therefrom to surround at least a portion of the stator and rotor assembly, the end and side walls of the endshield means being sized and adapted to define a flow through air circulating chamber adjacent the stator and rotor assembly; and, fan means mounted on the rotor shaft externally of the endshield means, the fan means being in communication with the defined flow through air circulating chamber to provide a negative pressure in the chamber during motor operation for circulation and passage of cooling air over the motor windings of the rotor and stator assembly.

It is to be understood that various changes can be made by one skilled in the art in the arrangement, form and construction of the several parts of the inventive structure disclosed herein without departing from the scope or spirit of the present invention. For example, the type and shape of stator and rotor assembly, endshield structure and fan construction and mounting can be modified without departing from the present invention.

BRIEF DESCRIPTION OF THE DRAWINGS

Referring to the drawings which disclose one advantageous embodiment of the present invention.

DESCRIPTION OF THE PREFERRED EMBODIMENT

Figure 1:
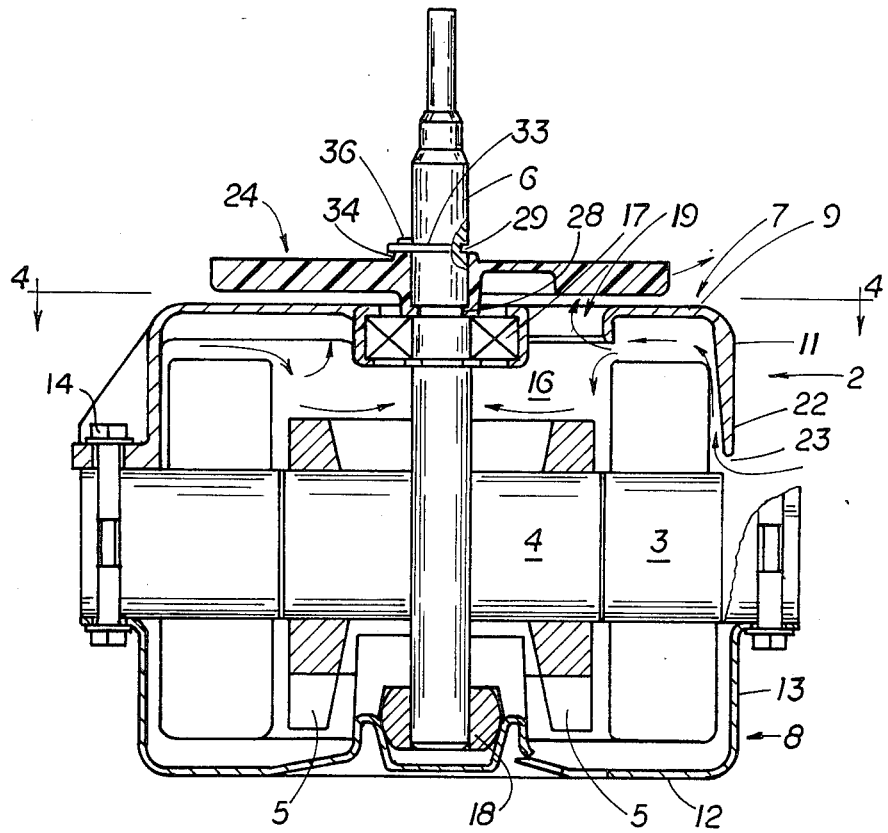
FIG. 1 is a cross-sectional view of the inventive electric motor ventilation structure (parts of which are not shown to simplify illustration), the flow arrows illustrating the general direction of air flow over the stator and rotor assembly of the motor, a portion of the endshield hold-down arrangement being broken away for this purpose.

Referring to FIG. 1 of the drawings, motor 2, which can be an induction type of motor, includes a stator 3 and rotor 4 assembly, the stator 3 having a central bore in which rotor 4 is rotatably disposed. Rotor 4 includes lower air circulating blades 5 mounted to an end ring on the rotor and a rotor shaft 6 vertically extending from the upper end of rotor 4. To encase the motor, spaced opposed horizontally disposed upper and lower endshields or endcasings, 7 and 8 respectively, are provided. Advantageously, upper endshield 7 can be of a one-piece diecast construction mold formed from a suitable aluminum alloy, zinc, plastic or other suitable material. The endshield 7 includes an horizontally extending end wall 9 and a peripheral side wall 11 extending vertically downward therefrom. Lower endshield 8, which can be formed from a suitable metallic material such as steel also includes an end wall 12 and a peripheral side wall 13. The upper and lower endshields 7 and 8 are secured to the rotor and stator assembly through suitably spaced screws or bolt and nut assemblies 14, the bolts passing through appropriately sized and configured bolt openings in the endshields and appropriate openings in extending corner sections of stator 3. It is to be noted that each of the endshields are sized and shaped to define an air circulating chamber 16 adjacent and surrounding the stator and rotor assembly. Further, each end wall of the endshields is respectively centrally formed to provide cradles to receive and support bearings therein for vertically disposed rotor shaft 6, the cradle of upper end wall 9 receiving ball bearing assembly 17 and the cradle of lower end wall 12 receiving journal bearing 18.

Figure 4:
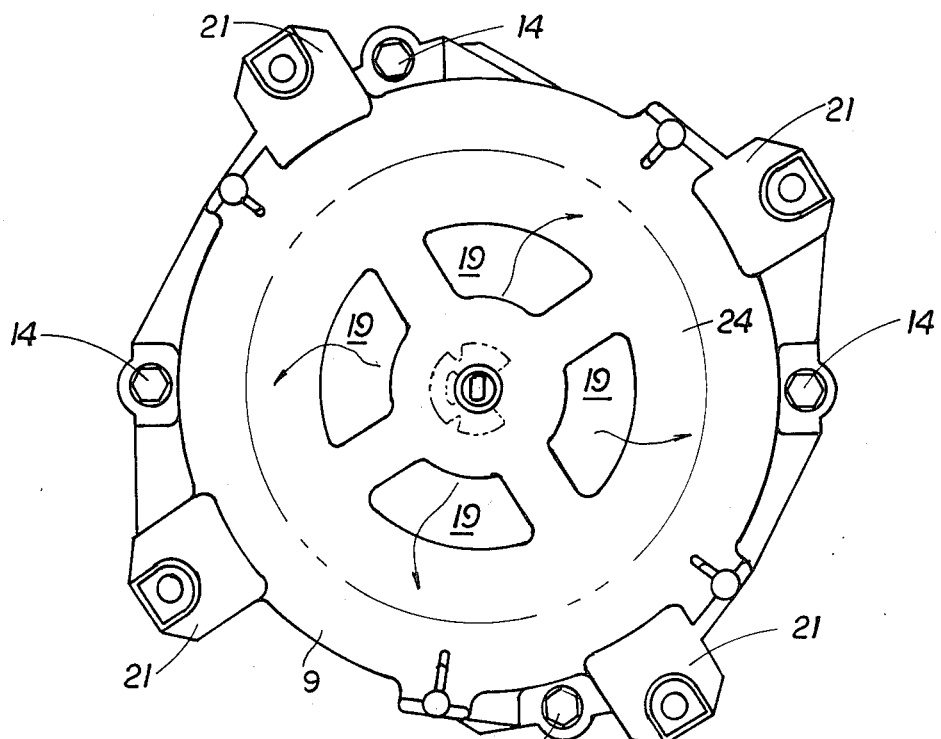
FIG. 4 is a top plan view of the motor structure of FIG. 1, the fan member and lock washer of FIGS. 1-3 being disclosed in phantom.

As can be more readily seen in FIG. 4 of the drawings, the upper end wall 9 also is provided with a plurality of circularly spaced arcuate trapezoidal-like outlet apertures 19 through which circulating air from chamber 16 surrounding the rotor and stator assembly can pass. Upper endshield or endcasing 7 is further provided with a plurality of apertured bosses 21 (shown in FIG. 4 only). These bosses 21 serve to receive appropriate bolt and nut assemblies to support the motor 2 below an appropriately bottom sealed liquid sump of a dishwasher, or the like, having a part such as an internal pump to which rotor shaft 6 can be connected (not shown).

Referring again to FIG. 1 of the drawings, it can be seen that the lower free extremity 22 of peripheral side wall 11 extending between securing bolts 14 of upper endshield 7 is spaced from the stator 3 of the rotor and stator assembly, the free extremity 22 of side wall 11 providing an air inlet 23 with stator 3, which inlet 23, except for the bolt securing arrangement, substantially surrounds the rotor and stator assembly of electric motor 2. It is to be noted that free extremity 22 is so contoured as to provide a venturi-like inlet for air as it is moved into air circulating chamber 16 which surrounds the rotor and stator assembly. It is to be understood that the spacing between endshield 7 and stator 3 and the venturi-like inlet spacing of extremity 22 and stator 3 can be adjusted, depending on the specific stator diameter, to give optimum airflow and wiping action over the motor windings to obtain maximum cooling of the windings. It has been found that spacing at the inlet can range from approximately 3/32nds to approximately 16/32nds of an inch and advantageously from approximately 3/32nds to approximately 8/32nds of an inch for optimum air wiping action so as to break the boundary layer of hot air.

Figure 5:
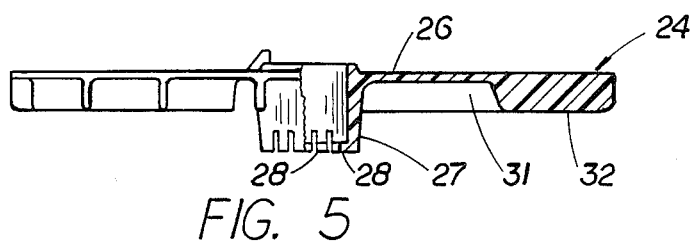
FIG. 5 is an enlarged cross-sectional view of the fan member of FIGS. 1-4.

Referring particularly to FIGS. 1-3 and FIGS. 5 and 6, it can be seen that rotor shaft 6 is provided with a "pull-through" fan member 24 positioned immediately above outlet apertures 19 in spaced relation from end wall 9 of upper endshield 7. Fan member 24, which can be formed from any one of a number of suitable materials, such as a sturdy plastic material or an aluminum or zinc alloy, is shown as formed as a flat circular air impervious disc 26 having integrally formed on the lower face (FIGS. 5 and 6) thereof so as to be positioned adjacent the air outlets 19 in the end wall 9 of upper endshield 7 a centrally disposed vertical hub 27. As can be seen in FIG. 5, hub 27 is vertically splined with the free ends of the splines 28 internally shaped to resiliently engage in shaft fastening relation with the lower of a pair of spaced annular grooves 29 on rotor shaft 6, the lower groove on shaft 6 being the one located most proximate to end wall 9 of upper endshield 7 (FIG. 1).

Figure 6:
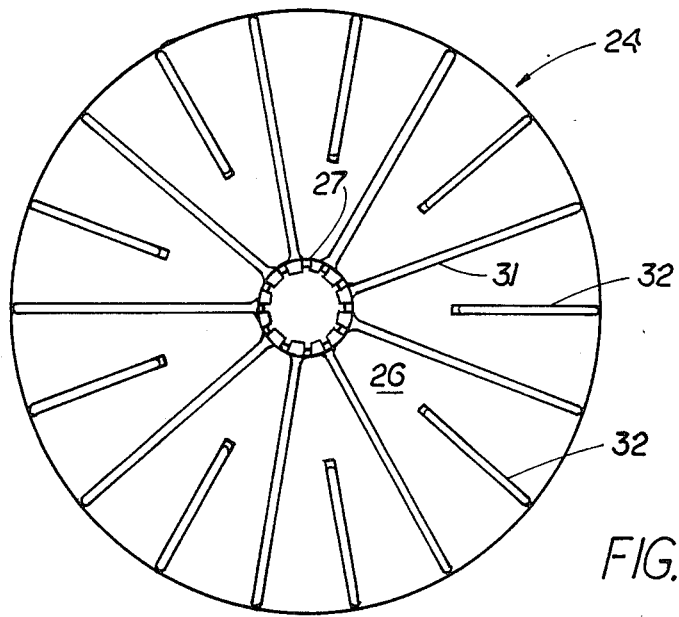
FIG. 6 is a bottom plan view or underside of the fan member of FIG. 5.

As can be seen in FIGS. 5 and 6, the lower face of air impervious disc 26 is formed with a plurality of integral substantially straight air moving blades 31 and 32 extending radially from hub 27. Blades 31 and 32 are of differing length for purposes of creating a preselected air circulation pattern. In this regard, it is to be understood that certain features of the blade design such as blade shapes, spacings and lengths can be varied by one skilled in the art to create the air circulation patterns desired without departing from the scope or spirit of this invention.

Figure 3:
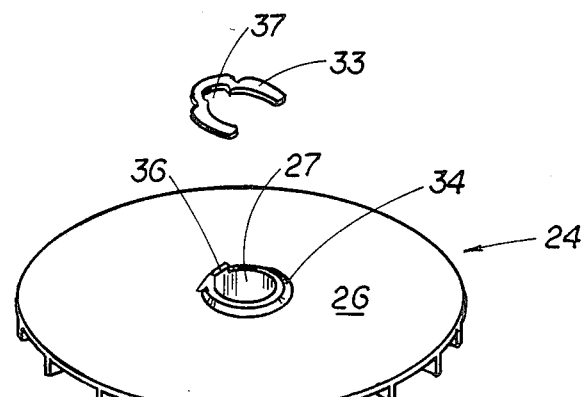
FIG. 3 is an upper exploded perspective view of the fan member and associated lock washer of FIGS. 1 and 2.
Figure 2:
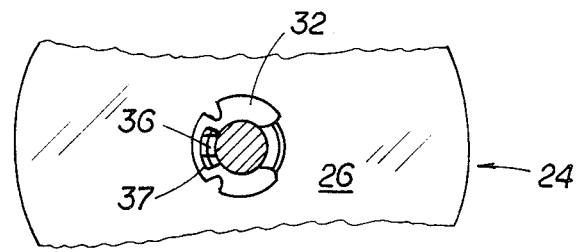
FIG. 2 is a plan view showing a portion of the upper face of the fan member of FIG. 1.

Referring particularly to FIGS. 1-3, it can be seen that a U-shaped lock washer 33 is provided to engage the other spaced grooves 29 on rotor shaft 6 to hold fan member 24 on shaft 6. In this regard, the upper face of flat disc 26 of fan member 24 is provided with a protruding annular bevel 34 above and surrounding the aperture of hub 27 and extending from this bevel 24 is a key protrusion 36. The base of flat U-shaped lock washer 33 is provided with a recess 37 of greater breadth than key protrusion 36. When U-shaped lock washer 33 engages in upper slot 29 of rotor shaft 6, the key protrusion 36 of fan member 24 loosely nests in recess 37 to restrict axial movement of the washer relative fan member 24 and to allow for tool insertion for washer removal.

In operation of the above inventive ventilation structure for an electric motor, the rotating radial blades on the lower face of fan member 26 create a negative pressure in chamber 16 defined by spaced upper and lower endshields 7 and 8 respectively, drawing circulating air through the venturi-like air inlet passage substantially surrounding the sides of the stator and rotor assembly at comparatively high velocity to break the hot boundary layer of air which exists in close proximity to the windings of the stator and rotor assembly, thus, increasing mass heat flow to the moving air stream, allowing a reduction in motor construction materials and thus lower motor costs without exceeding required temperature limits. The air is then further circulated by fan member 24 and lower rotor blades 5 in air circulating chamber 16 and is finally withdrawn or "pulled through" centrally through the arcuate air outlet apertures 19 in end wall 9 of upper endshield 7.

From the abovedescribed structure, it can be seen that various advantageous features including those abovenoted are achieved in a comparatively simple, compact, straightforward, inexpensive and efficient manner and that various changes can be made by one skilled in the art to the several parts of the structure without departing from the scope or spirit of this invention.

The invention claimed is:

1. An improved electric motor ventilation structure for dishwasher motor application comprising:
   a stator assembly and a rotor assembly, being rotatably disposed in a bore of said stator assembly and having a rotor shaft extending outwardly therefrom;
   spaced opposed endshields secured to said stator assembly for rotatably journalling said rotor shaft relative said stator assembly, at least one of said endshields including a radially extending end wall and an axially extending side wall positioned at least partially to surround a portion of said stator assembly and said rotor assembly, said end wall and said side wall being sized to define a flow through air circulating chamber adjacent said stator assembly and said rotor assembly with said end wall of said at least one endshield including aperture means disposed therein to provide an air outlet for said air circulating chamber and said side wall having an end thereof spaced in the range of approximately 3/32nds to approximately 8/32nds of an inch from the stator assembly of said motor, said side wall being contoured to provide a venturi-like air inlet for said air circulating chamber, said rotor shaft having a pair of axially spaced annular grooves positioned externally proximate said at least one endshield, and;

a flat, circular air impervious plastic disc-shaped fan member having on a face of said fan member adjacent said air outlet in the end wall of said at least one endshield an integral, centrally disposed vertical hub and a plurality of integrally formed blades of variable length extending in a radial direction from said hub, an extremity of said hub having a plurality of splines formed in it, the free ends of the splines shaped to engage the rotor shaft groove most proximate said end wall of said at least one endshield; and a U-shaped lock washer engaging the other of said grooves on said rotor shaft, said disc-shaped fan member having a key protrusion formed in it, the base of said U-shaped lock washer having a recess therein sized to receive said key protrusion when engaged with said rotor shaft groove to restrict axial movement of said washer relative said fan member.

2. An improved electric motor ventilation structure comprising:

a stator and rotor assembly, said rotor assembly being rotatably disposed with reference to said stator assembly and having a rotor shaft extending therefrom;

endshield means secured to said stator assembly for rotatably journalling said rotor shaft relative said stator assembly, said endshield means including an end wall and a peripheral side wall extending therefrom, said end and said peripheral side walls of said endshield means being sized and adapted to define a flow through air circulating chamber adjacent said stator and rotor assembly;

fan means mounted on said rotor shaft externally of said endshield means, said fan means being in communication with said flow through air circulating chamber to provide a negative pressure in said chamber during motor operation for the circulation and passage of cooling air over said rotor and stator assembly, said rotor shaft having spaced annular grooves approximate said end wall of said endshield means; and at least one U-shaped lock washer engaging with one of said grooves to retain said fan means on said rotor shaft.

3. The electric motor ventilation structure of claim 2, said rotor shaft having spaced annular grooves proximate said end wall of said endshield means and said fan means having a splined hub member with the free ends of said splined hub member being shaped to resiliently engage in at least one of said grooves in said rotor shaft to retain said fan means on said rotor shaft.

4. The electric motor ventilation structure of claim 2 wherein said fan means has a key protrusion extending therefrom and said U-shaped lock washer has a recess in the base thereof sized to receive said key protrusion when engaged in a groove on said rotor shaft to restrict axial movement of said washer relative to said fan means.

5. The electric motor ventilation structure of claim 2, said fan means comprising a flat, circular air impervious disc-shaped fan member having an integral centrally disposed hub member and plurality of integral blades extending in a radial direction from said hub member, said blades and said hub member being on the face of said disc in communication with said air circulating chamber, said hub member being splined with the free ends of said splines being shaped to engage in the rotor shaft groove most proximate said end wall of said endshield means, said lock washer being U-shaped and engaging the other of said rotor shaft annular grooves, said disc-shaped fan member having a key protrusion extending from the opposite face thereof, the base of said U-shaped lock washer having a recess therein sized to receive said key protrusion when engaged with the groove on said rotor shaft to restrict axial movement of said U-shaped lock washer relative said disc-shaped member.

* * * * *